United States Patent [19]
Keeler et al.

[11] Patent Number: 6,122,121
[45] Date of Patent: *Sep. 19, 2000

[54] DATA SECTOR/SERVO SPLIT GENERATOR FOR A DISK DRIVE

[75] Inventors: Stanton M. Keeler; Daniel S. Fisher; John A. Mount, all of Longmont, Colo.

[73] Assignee: Seagate Technology, Inc., Scotts Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,847

[22] Filed: Dec. 20, 1996

[51] Int. Cl.[7] .............................. G11B 5/09; G11B 5/596
[52] U.S. Cl. ........................................ 360/51; 360/77.08
[58] Field of Search ..................... 360/51, 77.08

[56] References Cited

U.S. PATENT DOCUMENTS

| | | | |
|---|---|---|---|
| 5,274,509 | 12/1993 | Buch | 360/51 |
| 5,276,564 | 1/1994 | Hessing et al. | 360/77.08 |
| 5,307,216 | 4/1994 | Cook et al. | 360/77.08 |
| 5,455,721 | 10/1995 | Nemazie et al. | 360/51 |
| 5,539,795 | 7/1996 | Takase | 360/77.08 |
| 5,627,695 | 5/1997 | Prins et al. | 360/51 |
| 5,798,885 | 8/1998 | Saiki et al. | 360/77.08 |

*Primary Examiner*—Aristotelis M. Psitos
*Assistant Examiner*—Regina Y. Neal
*Attorney, Agent, or Firm*—Merchant & Gould P.C.

[57] ABSTRACT

A data sector/servo split generator is disclosed for a disk drive apparatus implementing a zone bit recording format and having an embedded sector servo system where servo sector fields split at least one data field on a surface of a disk in the disk drive apparatus. A first counter is provided to count an amount of time to the beginning of a data field, and a first signal (SECTOR) is generated to indicate when the beginning of a data field is encountered by a read/write head in the disk drive. A second signal (SPLIT_VALID) is generated by the data sector/servo split generator if a next data field after the generation of the SECTOR signal is split by a servo sector field. A second counter counts a predetermined number of data bytes transferred between a surface of a disk in said disk drive apparatus and said disk controller, so that a third signal (SPLIT) is generated, the SPLIT_VALID signal is generated, when a servo sector is encountered in a data field by the read/write head. The SECTOR and SPLIT signals are supplied to a disk controller which uses those signals to control the transfer of data to and from the disk.

20 Claims, 4 Drawing Sheets

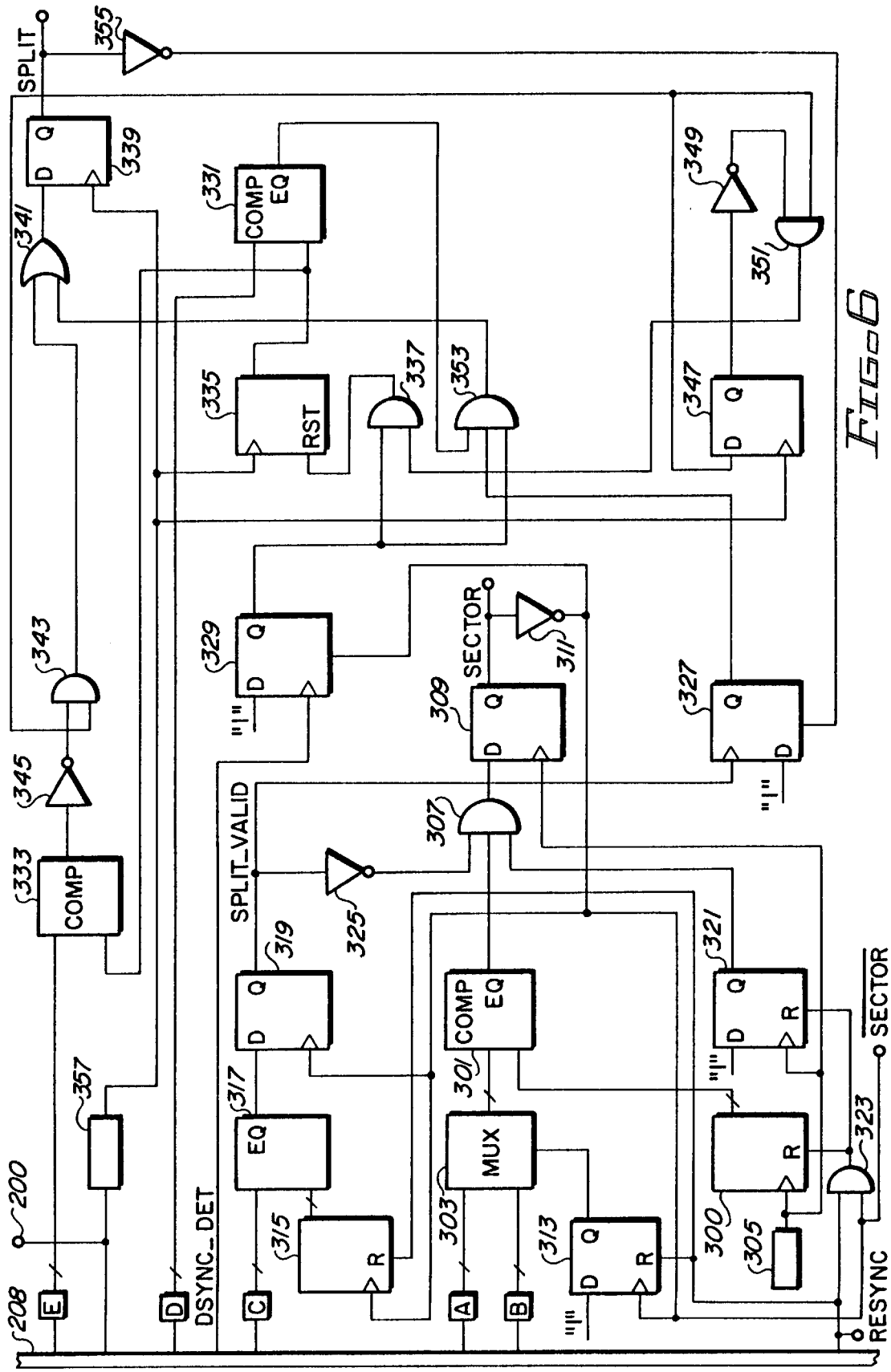

DATA SECTOR/SERVO SPLIT GENERATOR FOR A DISK DRIVE

FIELD OF THE INVENTION

The present invention is directed to disk drives. More particularly, the present invention provides a generator to generate servo control signals for use in a disk drive having both a zone bit data recording format and a sector servo head position control system.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface. Typically, each data track is divided into a number of data sectors that store fixed sized data blocks.

A head includes an interactive element, such as a magnetic transducer, that is used to sense the magnetic transitions to read data, or to transmit an electrical signal that causes a magnetic transition on the disk surface, to write data. The magnetic transducer includes a read/write gap that positions the active elements of the transducer at a position suitable for interaction with the magnetic transitions on the surface of the disk, as the disk rotates.

As known in the art, the magnetic transducer is mounted by the head to a rotary actuator arm and is selectively positioned by the actuator arm over a preselected data track of the disk to either read data from or write data to the preselected data track, as the disk rotates below the transducer. The head structure includes a slider having an air bearing surface that causes the transducer to fly above the data tracks of the disk surface due to fluid currents caused by rotation of the disk.

An important aspect of conventional disk drive design concerns position control of the head. A position control system is used to accurately position a head over a data track during data read and write operations. Whenever data are either written to or read from a particular data track, the transducer gap of the head should be centered over the centerline of the magnetic transitions of the data track where the data are to be written or from where the data are to be read, to assure accurate transduction of the transitions representing data. If the head is off-center, the head may transduce (i.e. either read or write, as the case may be) transitions from an adjacent track, and thereby corrupt the data.

A closed loop servo system is typically used to control the position of the actuator arm. In a known servo system, servo position information is recorded on the disk surface itself, and periodically read by the head for use in controlling the position of the actuator arm. Such a servo arrangement is referred to as an embedded servo system. In modern disk drive architectures utilizing an embedded servo system, each data track is divided into a number of data sectors for storing fixed sized data blocks, one per sector, as noted above. In addition, associated with the data sectors are a series of servo sectors that are generally equally spaced around the circumference of the data track. The servo sectors can be arranged between data sectors or arranged independently of the data sectors such that the servo sectors split data fields of the data sectors, as is well known.

Typically each servo sector is radially aligned with corresponding servo sectors of neighboring data tracks to form a set of radially extending, spoke-like servo sections that are equally spaced from one another around the circumference of the disk surface. The equal spacing between servo sectors provides a fixed frequency of servo occurrences regardless of the radial position of the head. However, when data are recorded in a zone bit arrangement, the number of data sectors within one rotation of a disk varies from zone-to-zone, thus causing the precise locations of servo sectors of the spoke-like sections, relative to the data fields of the data sectors, to vary from zone-to-zone and within a zone.

A zone bit arrangement is a known technique to maximize the storage capacity of a disk. In accordance with the fundamental geometry of a circle, the circumferences of the data tracks increase in a direction toward the outer diameter of the disk. Thus, each succeeding data track in the radially outward direction, has more potential data storage capacity than the preceding data tracks. A zone bit recording scheme takes advantage of the increasing circumference aspect of circle geometry. In a zone bit recording, the surface of the disk is divided into a set of zones. Each zone extends for a fixed radial length, and the magnetic transition frequency is increased from zone-to-zone, in the radially outward direction. Accordingly, the number of data sectors in each track increases, from zone-to-zone, in the radially outward direction.

In an embedded servo system, each servo sector contains magnetic transitions that are arranged relative to a track centerline such that signals derived from the transitions can be used to determine bead position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

In a conventional disk drive design, each data field of a sector includes an address header comprising magnetic transitions that represent unique identification information for the specific data stored in the data sector. In this manner, the disk drive system can locate and verify the exact data sector for any particular block of data that a host computer may require, e.g., in a read operation. Among the information stored in an address header of a zone bit recording format is a split count to indicate the number of data bytes in the data field until a servo sector splits the data field. The electronics system in the disk drive uses the split count information to suspend data read or write processing while the head is over the servo sector. The control is typically handled directly by a disk controller circuit that receives the header split count information.

A disk controller circuit is used in conventional disk drive designs to receive, during a read operation, serial signals derived from the transduction of magnetic transitions that represent bits of information. The disk controller operates to de-serialize the bits into eight bit bytes for transfer to the host computer. An eight bit byte is the data structure typically used by a host computer when processing, storing or transmitting data. The disk controller also operates to serialize bytes received from the host computer into a stream of bits, during a write operation, for transfer to a disk surface. In this manner, the disk controller permits the transfer of data between the byte architecture of a host computer and the serial storage architecture of a disk drive.

Overhead refers to portions of a disk surface that are used to store information necessary for the control of the disk drive. Space on a disk surface used to store control information is not available to store data, and thus reduces the storage capacity of the disk drive. The servo sectors and address headers discussed above are examples of overhead. A split count can occupy two bytes of a header and thus contributes to overhead.

Another system for handling split data fields comprises a register that stores servo sector locations for each of the zones of the disk surface. This approach removes the need for incurring overhead on the disk surface for the storage of split count information. During read or write operation of the disk drive, a current servo sector location is output from the register, and an appropriate data clock increments a counter. An output of each of the counter and register is coupled to a comparator that operates, during each clock cycle, to compare the location register output to the current counter output. When these values are equal, the comparator transmits a signal to a control unit, that, in turn, controls switches to "freeze" the operation of the disk controller circuit by opening electric paths between the disk controller circuit and clock signals used to control circuit operation.

The known location register approach, however, makes the servo split control transparent to the disk controller, and thus removes the ability to directly and precisely control disk controller operations in connection with the handling of data read and write operations in the presence of servo sectors that split data fields. For example, disk drives typically control read and write operations via the assertion of READ GATE (RG) and WRITE GATE (WG) signals. The disk controller is responsive to the RG and WG signals to control operations that define byte boundaries when either serializing or de-serializing bits. The known location register approach is not cognizant of the state of the RG and WG signals, but simply freezes disk controller operation, from a control point that is external to the disk controller, at a time that should coincide with the arrival of the head over a servo sector. Thus, while the known location register approach reduces overhead on the disk surfaces, there is no assurance that disk controller operations are frozen exactly at a byte boundary between the last byte before the split and the servo sector.

SUMMARY OF THE INVENTION

The present invention provides a data sector/servo split count generator that generates control signals useable by a disk controller to efficiently and precisely control the suspension of read or write operations during the time a head is passing over a servo sector. Generally, the data sector/servo split count generator utilizes split count information stored in a memory component such as a ROM available in the disk drive. The use of a ROM reduces overhead on the disk surfaces. The split count information contains the split count for each servo sector that splits a data field, on a servo sector basis. An offset count value can also be determined from each split count. Each offset value represents the number of bytes in a split data field that remain after the servo sector.

According to the present invention, the generator is directly controlled by clock cycles relevant to the frequency of occurrence of each of the data sectors and servo sectors, and outputs a first signal (a SECTOR signal) and a third signal (a SPLIT signal) as a function of these clock cycles. The disk controller receives each of the SECTOR and SPLIT signals as an indication of the arrival of a data sector or servo sector, respectively. This permits precise internal control of the disk controller to assert or de-assert RG and WG signals. For example, the disk controller can continue, after receiving a SPLIT signal pulse, either the current read or write operation, as the case may be, until a current byte is completely de-serialized or serialized. After the completion of the current byte, the disk controller will de-assert the RG or WG signal. Thus, the read or write operation can be suspended precisely on a byte boundary between the last byte of data before the split and the beginning of the servo sector indicated by the SPLIT signal.

The SECTOR pulses are generated by a counter that is based upon a fixed frequency reference. The frequency of the pulses output by the counter is adjustable. At any one time, the time interval between pulses is set to correspond to the specific time intervals between data sectors within the zone where the head is currently located. The beginning of the pulse output, after the end of a servo sector, is controlled by the offset count value for the current servo sector, which value can be stored in an offset register. In this manner, the disk controller can precisely control serialization and de-serialization processing as a function of the succeeding SECTOR pulses, until a next servo sector is encountered.

Assertion of the SPLIT signal is controlled as a function of the split count for the next servo sector to be encountered by the head. The split count for that servo sector is retrieved from the ROM or other memory device and stored in a split count register. The generator receives the byte clock from, e.g., the disk controller, and counts bytes for each data sector until the stored split count value is reached. Whenever the count equals the value stored in the split count register, a SPLIT pulse is asserted. The generator also generates a second signal, a SPLIT_VALID signal, which indicates a data sector having a servo split. The SPLIT_VALID signal can be generated as a function of the SECTOR signal or a SERVO GATE (SG) signal provided by the servo control of the disk drive upon each occurrence of a servo sector, as will be explained in more detail below.

According to the present invention, the SPLIT_VALID signal is generated after the assertion of the last SECTOR pulse prior to the servo sector. This is accomplished by programming the number of desired SECTOR pulses between servo sectors during the preceding servo sector. When this count expires the SPLIT_VALID signal will be activated, allowing a split in the data field. The width of each SPLIT pulse is programmable and is set to a length that permits the disk controller to de-assert RG or WG at the end of the last byte, and then re-assert RG or WG after the passage of the servo sector, and before the first byte of the remaining bytes of the split data sector.

Thus, the present invention provides a control scheme that correlates clocks tightly associated with servo and data sector timing to generate additional control signals such as the SECTOR and SPLIT signals.

These additional signals are usable by the disk controller to directly and precisely control assertion of RG and WG signals for accurate and dependable processing of data during read and write operations in a zone bit recording utilizing an embedded servo control. Moreover, various values relevant to the determination of the control signals are programmable to accommodate the variations in splits encountered in a zone bit recording. These values include the split and offset values, data sector timing from zone to zone and the duration of the SPLIT pulse. The programmability feature of the present invention does not impose a significant microcode overhead on the disk drive electronics because the updating of some values are performed on a zone-by-zone and some on a servo sector-by-sector basis, and primarily involves information look-up in a ROM or other memory device and writing to registers.

BRIEF DESCRIPTION OF THE DRAWINGS

FIG. 6 is a block diagram of the data sector/servo split generator of FIG. 5, according to the present invention.

DETAILED DESCRIPTION OF THE PREFERRED EMBODIMENT

Figure 1:
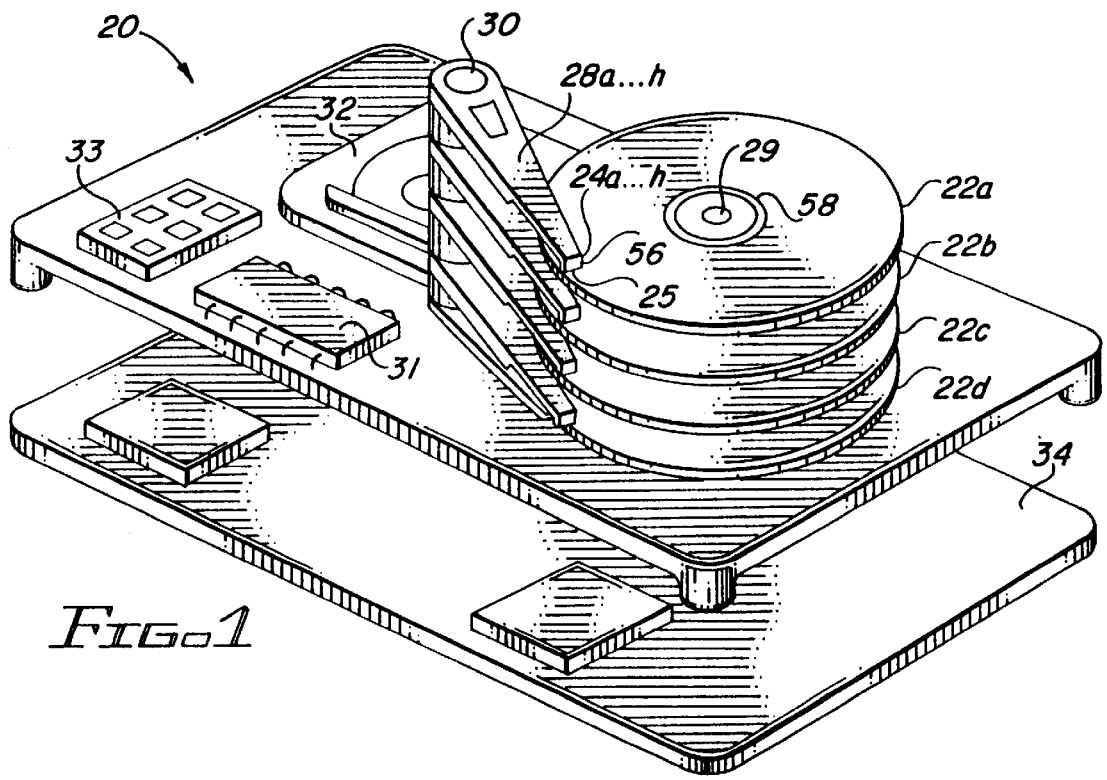
FIG. 1 is a perspective view of an exemplary disk drive.

Referring now to the drawings, and initially to FIG. 1, there is illustrated an example of a disk drive designated generally by the reference numeral 20. The disk drive 20 includes a stack of storage disks 22a–d and a stack of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The heads are coupled to a pre-amplifier 31. During a read operation, electrical signals transduced by the transducer from the magnetic transitions on the disk surface, are processed by the pre-amplifier 31 and transmitted to read/write channel circuitry in the disk drive for eventual transmission to a host computer using the disk drive to store data. During a write operation, electrical signals representative of data are received by the read/write channel from the host computer for transmission to the pre-amplifier. The pre-amplifier 31 includes a write driver electrically coupled to the head transducer to transmit the signals corresponding to the data to the head. The head is responsive to the signals received from the write driver to conduct an electric signal and thereby cause magnetic transitions on the disk surface that correspond to the data.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted an a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60 (see FIG. 2), where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage disks 22a–d. The manner for coupling the PCB 34 to the various components of the disk drive is well known in the art, and includes a connector 33 to couple the read/write channel circuitry to the pre-amplifier 31.

Figure 2:
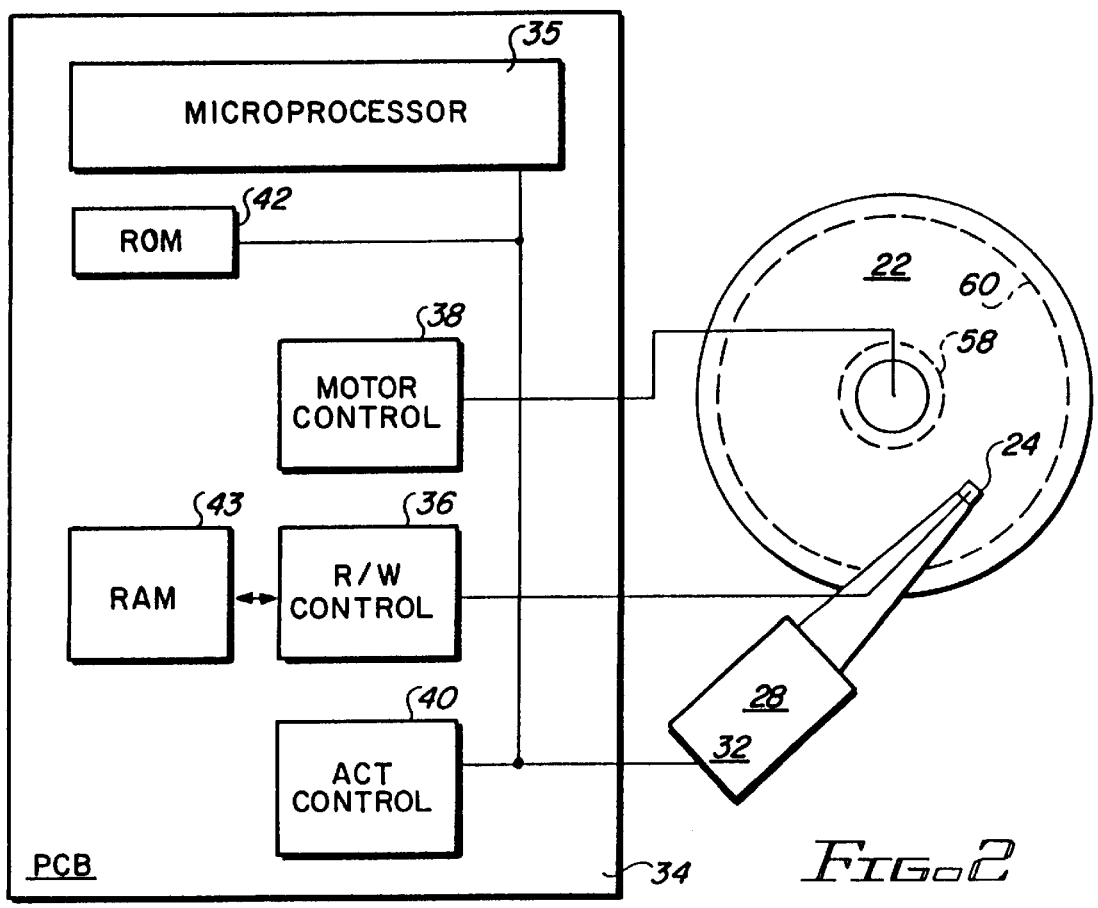
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 commands the read/write control 36 to send data to/from the RAM 43 from/to the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexor (not shown) is used to couple the head 24a–h over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of individual data sectors.

The RAM 43 can be used to buffer data read from or to be written to the data sectors of the storage disks 22a–d via the read/write control 36. The buffered data can be transferred to or from a host computer that is utilizing the disk drive for data storage.

Figure 3:
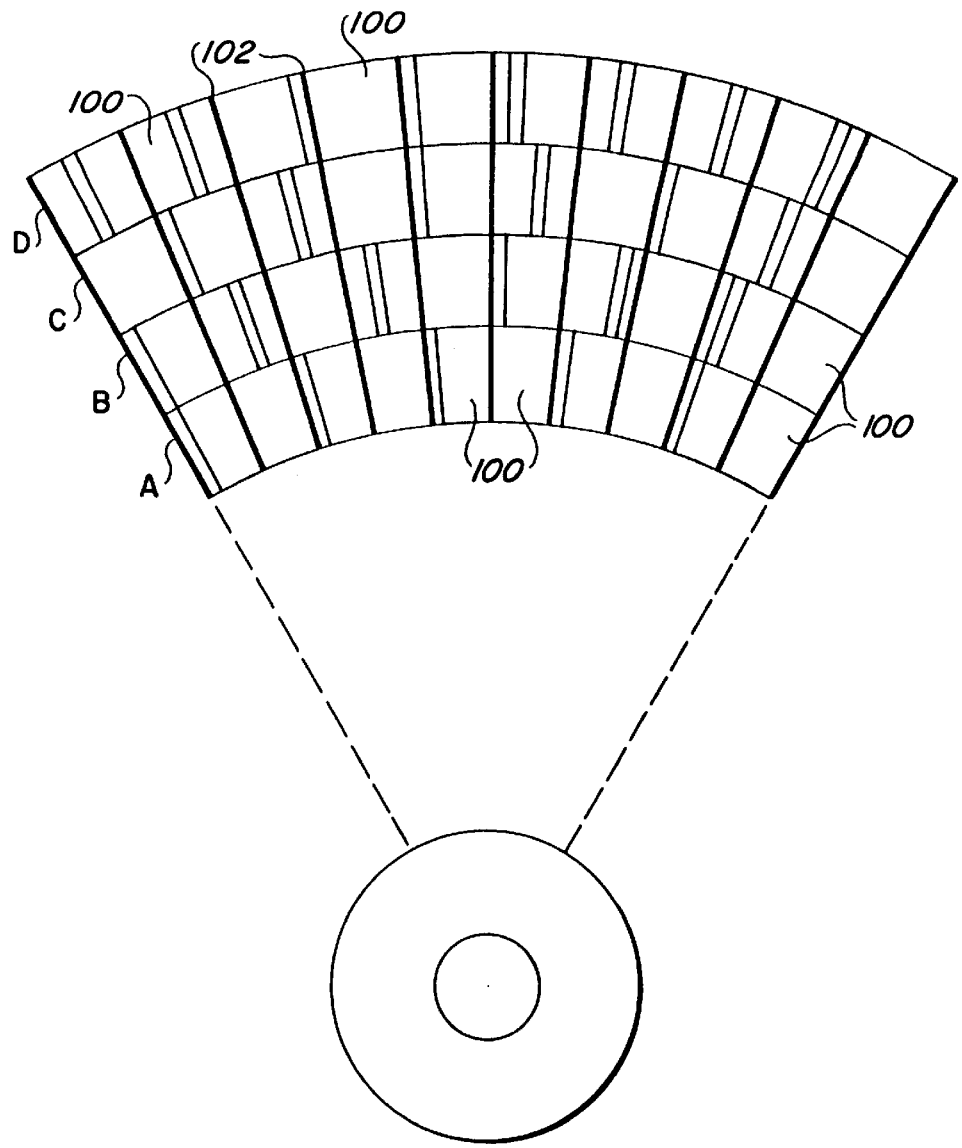
FIG. 3 is a top plan view of a section of a disk of the disk drive of FIG. 1, illustrating a zone bit recording with a sector servo.

FIG. 3 is a top plan view of a section of one of the disks 22a–d. As shown in the drawing, the disk surface is divided into four zones labeled A, B, C and D. For the arc length depicted in FIG. 3, the circumferential extent of the zones increases in the outward direction, with zone D having the greatest length and zone A having the smallest length. Accordingly, the number of data sectors 100 that are positioned within data tracks located in each of the sections of the zones increases from zone A to zone D. The servo sectors are represented by radially extending lines 102 that are equally spaced from one another. Due to the varying numbers of data sectors 100 within the zones A, B, C and D, the servo sectors 102 split the data sectors 100 at different locations from zone-to-zone and within each zone.

Figure 4:
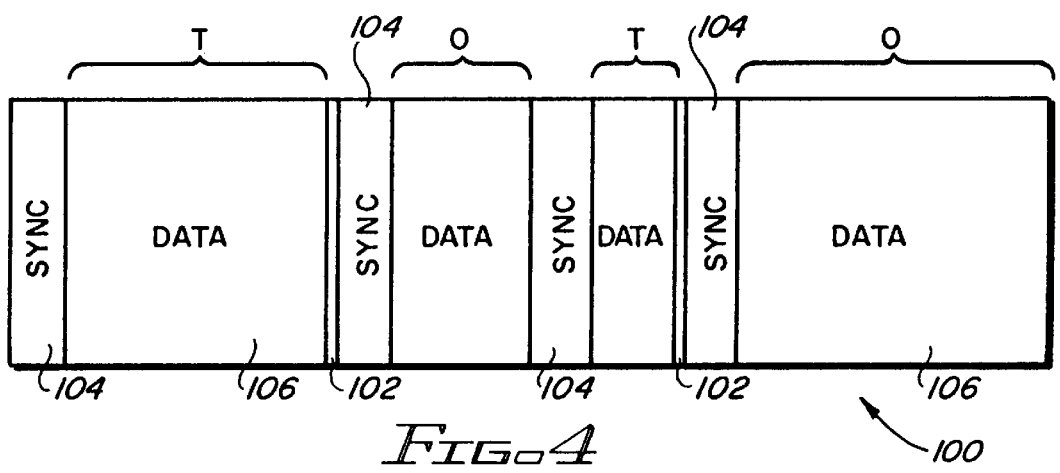
FIG. 4 presents a diagram of the format of representative data sectors, as recorded within the data tracks of the disk of FIG. 3, including servo sectors that split data fields.

FIG. 4 presents a diagram of the format of representative data sectors from data tracks of zone B. More specifically, the figure shows two data sectors from the left side of the section of zone B. The left end of the first data sector 100 includes a DATA SYNC field 104 containing recorded magnetic transitions that are used to synchronize the read and write electronics of the read/write control 36 to the frequency of magnetic transitions recorded on the disk surface in the following data field. The DATA SYNC field 104 is followed by a data field 106 which can comprise a header followed by the actual data, or a headerless data structure. One skilled in the art will appreciate that the present invention can be used in the conventional data format shown in FIG. 4 as well as a merged ID or a headerless data format.

As shown in FIG. 4, a servo sector 102 splits the data field 106 near the middle of the field. Another DATA SYNC field 104 follows the servo sector 102, before the resumption of the remaining bytes of data. T designates the number of bytes of data within the data field before the servo sector split and O represents the number of bytes of the data field after the split. The next data sector 100 is the same as the first data sector 100, except the servo sector split is now toward the beginning of the data field, such that the number of bytes T is less than the number of bytes O for this sector. As should be understood, the values of T and O change from sector to sector as a function of the location of servo sector splits, which, as noted, change throughout the disk surface, from zone to zone and within a zone, with some data fields being unaffected by a servo sector.

According to a feature of the present invention, the split byte counts T for all of the split data sectors are stored in the ROM or other memory device 42. A similar inventory of offset values O can also be maintained in the ROM 42, or the microprocessor 35 can be used to calculate an O value from the T value for each sector (or vice versa), as needed.

Figure 5:
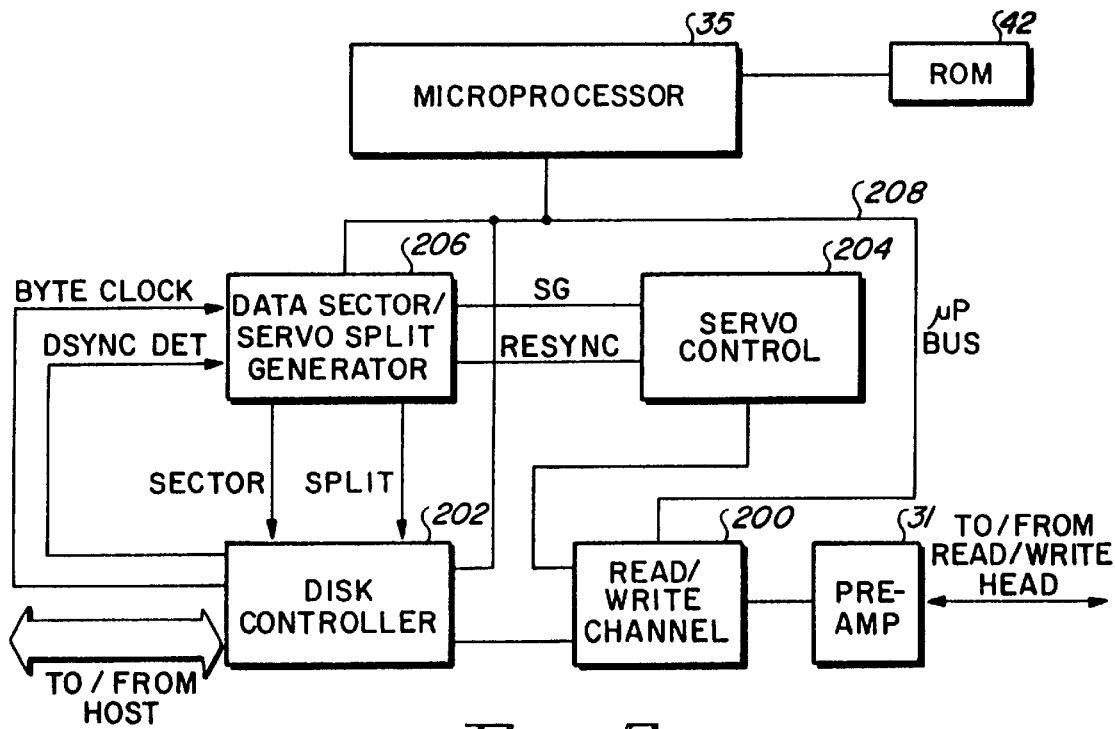
FIG. 5 is a simplified block diagram of the read/write control circuit of FIG. 2, including a data sector/servo split generator according to the present invention.

Referring now to FIG. 5, there is shown a simplified block diagram of the read/write control 36. In the case of a read operation, signals transduced by a head are amplified by the pre-amplifier 31 and transmitted to a read/write channel 200. The read/write channel 200 can implement any of a variety of known techniques for separating signals representing bits, from the raw signal provided by the pre-amplifier 31. The separated data signal is transmitted to a disk controller 202 for de-serialization into bytes, as described above. The disk controller 202 monitors the received data signal for a DATA SYNC field 104 and asserts a DSYNC_DET signal upon detection of the field. The disk controller 202 uses the SYNC field read from the disk surface to set a BYTE_CLOCK cycle for de-serialization of bit information received from the read/write channel 200. As shown in FIG. 5, the disk controller 202 can include an interface circuit to transfer bytes of data to or from a host computer.

A raw data signal is transmitted from the read/write channel 200 to a servo control 204 to analyze the signal for a servo sector or address mark field (AM). The AM field is an asynchronous, absolute timing reference that identifies the beginning of a servo sector and provides the basis for locating the other fields of the servo sector, including the positioning bursts discussed above. The AM field can comprise an absence of transitions positioned between a preamble and a first transition of the servo information. The preamble can be a fixed frequency series of a preselected number of dibits. Thus, the AM field is detected by monitoring the raw data for a preamble followed by a window of silence (no transitions detected). The AM silence extends for a range of between two to four bytes, followed by a first magnetic transition of the remaining servo information.

In connection with an AM field detection, the servo control asserts a SERVO GATE (SG) signal at intervals that coincide with the frequency of occurrence of the servo sectors. The rising edge of each SG pulse is at the beginning of a servo sector and the trailing edge is at the end of the servo sector. The servo control utilizes the rising edge as a timing signal to begin looking for an AM field. When an AM field is found, the AM signal (RESYNC) is asserted. The RESYNC signal is used as the timing reference for SECTOR mark generation.

Pursuant to the present invention, a data sector/split count generator 206 is coupled to each of the servo control 204 and disk controller 202. The RESYNC signal and SG signal from the servo control 204 and DSYNC DET signal and BYTE_CLOCK from the disk controller 202 are each transmitted to the data sector/split count generator 206 as an input. The data sector/split count generator 206 utilizes the BYTE_CLOCK, RESYNC, DSYNC DET, and SG signals to control the timing of generation of each of a SECTOR and SPLIT signal for transmission as an input to the disk controller 202, as will be described in detail below. The SECTOR signal marks the beginning of each data sector and the SPLIT signal is asserted for the duration of each servo sector. These signals are used by the disk controller 202 for direct internal control over the timing of serialization and de-serialization operations as well as the suspension of such operations during the passage of a servo sector below an active head.

As also shown in FIG. 5, a microprocessor bus(s) 208 couples the microprocessor 35 to each of the read/write channel 200, disk controller 202 and servo control 208 for the transfer of control and status information between these components, as generally known in the art. The microprocessor bus(s) 208 also couples the microprocessor 35 to the data sector/split count generator 206. One skilled in the art will appreciate that the read/write channel 200 could also be connected to the microprocessor 35 via a high speed serial port on the microprocessor 35 (not shown). The read/write channel 200 could also be coupled to a read/write controller (element 36 in FIG. 2) via a high speed serial port.

FIG. 6 provides a block diagram of the data sector/servo split generator 206 according to the present invention. The generator 206 comprises a set of counters that are synchronized to signals tied to the timing of occurrences of servo and data sectors as well as byte times and other clocks within the disk controller 202.

In FIG. 6, hatch marks indicate that the value on that signal line is represented by more than one bit.

A first counter 300 is clocked by a servo clock or fractional multiple thereof by SVO CLK 305. The output of the first counter is supplied as a first input to a comparator 301. The second input of the comparator 301 is coupled to the output of a multiplexor 303 which selects between two values supplied from the microprocessor bus 208. The first value stored in register A, represents the number of clock cycles supplied by SVO CLK 305 between the occurrence of the RESYNC signal and the first SECTOR mark. When the first counter 300 reaches the value stored in A, a signal is asserted at the output EQ of the comparator 301 which is supplied to AND gate 307. The output of AND gate 307 is supplied to the D input of D flip-flop 309 which is clocked by SVO CLK 305. The output of the D flip-flop 309 is the SECTOR signal mentioned above which represents the beginning of a data sector.

The SECTOR signal is inverted by invertor 311 and supplied as the clocking input of a D flip-flop 313. This flip-flop 313 has a constant high-value D input {shown as a "1" in FIG. 6). D flip-flop 313 is initially reset by the assertion of the RESYNC signal causing MUX 303 to first select the value in the A register. When the SECTOR signal is asserted, the output of the D flip-flop 313 goes high causing MUX 303 to select its second value (stored in the B register) and supply that value to the comparator 301. The value stored in the A register represents the amount of time from the detection of the address mark to the first SECTOR mark. The value stored in the B register via the microprocessor bus 208 represents the number of clock cycles from SVO CLK 305 between each SECTOR signal, for data sectors without a split.

The inverted SECTOR signal is supplied as a clock input to a second counter 315, which counts the number of occurrences of the SECTOR signal. The count value output by the counter 315 is supplied to a comparator 317 where it is compared to a value stored in the C register. The value in the C register represents the number of SECTOR signals that are to be generated between the current servo bursts in this particular data region between servo sectors (in this example the value in the C register would be 3). When the two values are equal, a signal is asserted on the EQ output of the comparator 317 and supplied to a D flip-flop 319. This D flip-flop 319 is clocked by the inverted SECTOR signal. The output of the D flip-flop 319 is the SPLIT_VALID signal indicating the presence of an active head over a data sector with a split.

The SPLIT_VALID signal is supplied as an input to AND gate 307 via an invertor 325. The remaining input of AND gate 307 is supplied by a D flip-flop 321. The D flip-flop 321 is clocked by SVO CLK 305 and its D input is held high (indicated by a logical "1"). Both the first counter 300 and the D flip-flop 321 have reset inputs coupled to the output of an AND gate 323. The AND gate 323 receives as inputs the inverted SECTOR signal and the inverted RESYNC signal. The counter 300 and the D flip-flop 321 are reset when either the RESYNC signal or the SECTOR signal is asserted.

The SPLIT_VALID signal is supplied to the clock input of a D-flip-flop 327. The D input of the D-flip-flop 327 is held high (as indicated by the notation "i"). The output of the D flip-flop is supplied to an AND gate 353. The second input of the AND gate 353 is coupled to the output of a D flip-flop 329. Again, the D input of the D flip-flop 329 is held high. The clock input of the D flip-flop is coupled to the signal DSYNC_DET which is asserted on the microprocessor bus 208 when the DATA SYNC field 104 (FIG. 4) is read. The reset input of the D flip-flop 329 is coupled to the SECTOR inverter 311 signal. Therefore, this flip-flop 329 is reset when the SECTOR signal is asserted and the output of the flip-flop goes high when the DSYNC_DET signal is asserted.

A BYTE_CLOCK (or BYTECLK 357) signal is generated from the synchronized clock received from the R/W channel 200, which is at the frequency that bytes of user data are read from or written to the disk. The BYTECLK 357 signal is supplied to the clock input of a third counter 335. The output of the counter 335 is coupled to a first input of first and second comparators 331 and 333. The second input of the first comparator is coupled to a register D from the microprocessor bus 208. The D register represents the split count, which is the number of bytes (minus one) before the split occurs on the last data sector prior to the next servo burst. Referring back to FIG. 4, the split count in the D register would be the value T minus 1 (in this embodiment). The EQ of the comparator is supplied to the remaining input of AND gate 353.

The second input of the second comparator 333 is coupled to an E register coupled to the microprocessor 208. The value stored in the E register is the split length, which is the number of data byte times (as measured by the BYTECLK 357) required to delay over the servo burst on a split sector. As with all of the values in the A–E registers, the microprocessor can supply the appropriate values for these registers depending on the zone where the head currently resides. The EQ output of the second comparator 333 is supplied through an invertor 345 to a an AND gate 343.

In operation, after the DSYNC_DET signal is asserted, the counter 335 counts until the value in the split count register D is reached. At that time, if SPLIT_VALID is active, the signal, SPLIT, is asserted. The counter 335 is reset and counts until the value stored in the split length register E is reached. At that time, the SPLIT signal is deasserted. If SPLIT_VALID is not active when the counter reaches the split count value in register D, the counter is reset and will start counting at the next DSYNC_DET signal.

The SPLIT signal is supplied by a D flip-flop 339 which is clocked by the BYTECLK 357. The D input is coupled to the output of an OR gate 341. The first input of the OR gate is coupled to the output of the AND gate 343 and the second input of the OR gate is coupled to the output of the AND gate 353. AND gate 353 enables OR gate 341 if the DSYNC_ DET signal has been asserted by D flip-flop 329; counter 335 has reached the split count value stored in the D register (as indicated by comparator 331); and the SPLIT_VALID signal has been asserted by D-flip-flop 327. D-flip-flop 327 will pass the asserted SPLIT_VALID signal to its Q output only if the SPLIT signal has not yet been asserted (which is coupled via the negatively asserted reset input via invertor 355). This is because the SPLIT signal should occur after the beginning of a data sector (which is indicated by the SPLIT VALID signal). AND gate 343 enables OR gate 341 if the counter 335 has not reached the split length value stored in register E (as indicated by comparator 333) and the SPLIT signal is asserted.

The BYTECLK 357 is further coupled to the clock input of a further D flip-flop 347. The D input of the flip-flop 347 is coupled to the SPLIT signal output of D flip-flop 339. Thus, once the SPLIT signal is asserted, it is supplied to the Q output of the D flip-flop 347 upon occurrence of the next BYTECLK pulse. The inverted SPLIT signal from invertor 349 is supplied with the actual SPLIT signal from flip-flop 339 to the inputs of a NAND gate 351. The effect of this logic is that when the SPLIT signal is asserted to indicate the start of the data sector split, the counter 335 is reset via AND gate 337 on the appropriate BYTECLK boundary. To summarize, AND gate 337 controls the resetting of clock 335 such that it is reset upon the occurrence of the DSYNC DET signal so as to count to the value in the split count register D, and the counter is also reset when the SPLIT signal is asserted so that the clock will count to the value in the split length register E.

Figure 7:
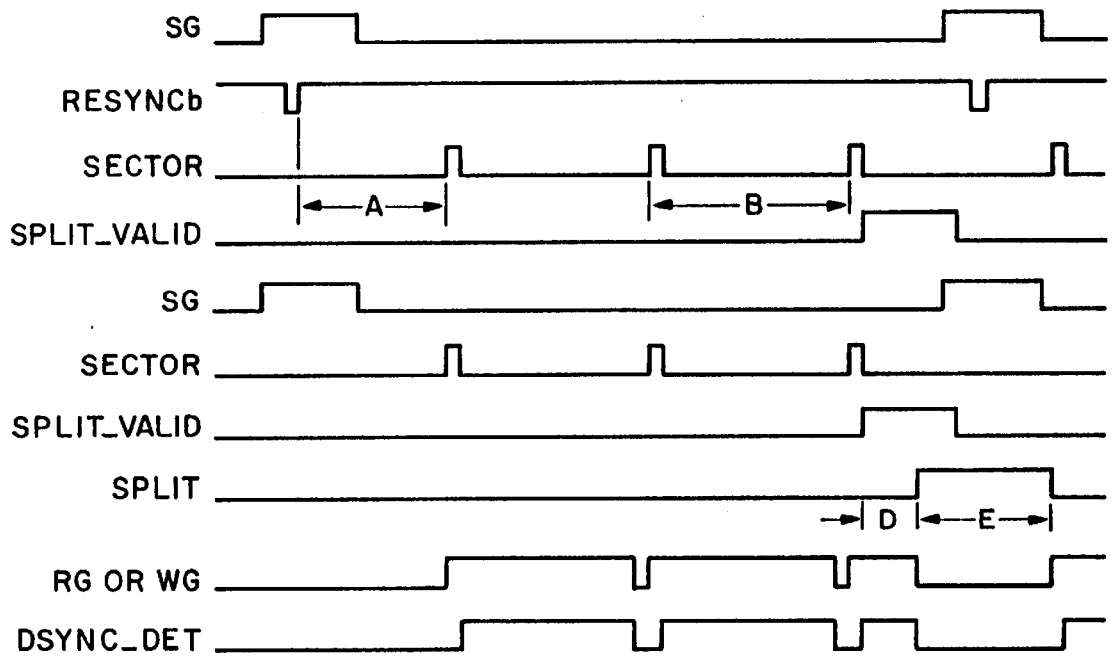
FIG. 7 is a timing diagram relating to the operation of the data sector/servo split generator of FIG. 6.

FIG. 7 provides a timing diagram for signals relevant to the operation of the sector/split count generator 206. As described above, the servo control 204 asserts an SG pulse at each servo sector. The SG pulse causes the servo control 204 to search for an AM field. Upon detection of an AM field, the servo control asserts a RESYNC signal for internal control of servo operations of the current servo sector, as generally known in the art. In this embodiment, RESYNC is a negatively asserted signal. The duration of each SG pulse coincides with the time an active head is over the current servo sector.

The trailing edge of the RESYNC signal starts the timing for the value A, the amount of time between the RESYNC signal and the first SECTOR mark. The leading edge of the SECTOR signal starts the timing for the value B, the time between SECTOR marks for data sectors without a split. The SPLIT_VALID signal is asserted at the trailing edge of the final SECTOR mark (as indicated by the count in the C register). The SPLIT_VALID signal indicates that the head is over a data sector that contains a split. The value D represents the split count (the time between the DSYNC_ DET signal and the servo split). The SPLIT signal cannot be asserted unless the SPLIT_VALID signal has been asserted. The Read Gate (RG) and Write Gate (WG) signals are included to show their relationship to the signals used in the sector/split count generator 206.

We claim:

1. In a disk drive apparatus implementing a zone bit recording format and having an embedded sector servo system where servo sector fields split at least one data field on a surface of a disk in said disk drive apparatus, said disk drive apparatus having a read/write controller including a disk controller coupled to a data sector/servo generator, said disk controller controlling a transfer of data between a host and a surface of one of a plurality of disks in said disk drive apparatus via a read/write head, said data sector/servo split generator comprising:

a first counter counting a first amount of time to a beginning of a data field, such that a first signal is generated when a beginning of a data field is encountered by a read/write head, said first signal being supplied to a disk controller in a disk drive apparatus, such that a second signal is generated by said data sector/servo split generator if said data field after the generation of said first signal is split by a servo sector field;

a second counter counting a predetermined number of data bytes transferred between a surface of a disk in said disk drive apparatus and said disk controller, such that a third signal is generated when said second signal is generated and said predetermined number of data bytes are transferred between said disk and said disk controller indicating a servo sector field split of said data field, said third signal being sent to said disk controller, such that said disk controller controls the transfer of data and servo information from and to said disk in dependence on said first and third signals; and means for generating a signal as a timing reference for marking a sector such that the first signal is subsequently generated, wherein the timing reference signal is independent of the rotational position of the disk the timing reference signal being a synchronizing signal for effectively generating a sector pulse signal which is independent of an index signal related to the rotational position of the disk.

2. The data sector/servo split generator of claim 1 wherein said first amount of time value is supplied by a microprocessor coupled to said data sector/servo split generator.

3. The data sector/servo split generator of claim 2 further comprising:

a first register storing said first amount of time from said microprocessor such that when said first counter reaches a value equal to said first amount of time, said first signal is generated.

4. The data sector/servo split generator of claim 3 further comprising:

a first comparator coupled to said first register and said first counter, said comparator generating said first signal when an output of said counter and an output of said first register are equal.

5. The data sector/servo split generator of claim 1 wherein said first amount of time is an amount of time between a detection of an address mark on the surface of said disk and the beginning of a data sector.

6. The data sector/servo split generator of claim 1 wherein said predetermined number value is supplied by a microprocessor coupled to said data sector/servo split generator.

7. The data sector/servo split generator of claim 6, further comprising:

a second register storing said predetermined number from said microprocessor, such that said third signal is generated when said predetermined number of data bytes are transferred between said disk controller and said disk and said second signal is generated.

8. The data sector/servo split generator of claim 7 further comprising:

a second comparator coupled to said second counter and said second register, said comparator indicating when an output of said second register is equal to an output of said second register.

9. The data sector/servo split generator of claim 1 further comprising:
   a third counter counting a number of occurrences of said first signal;
   a third register storing a value from said microprocessor representing a predetermined number of said occurrences of said first signal; and
   a third comparator coupled to said third counter and said third register, said third comparator outputting said second signal when an output of said third counter is equal to an output of said third register.

10. In a disk drive apparatus implementing a zone bit recording format and having an embedded sector servo system where servo sector fields split at least one data field on a surface of a disk in said disk drive apparatus, said disk drive apparatus having a read/write controller including a disk controller coupled to a data sector/servo generator, said disk controller controlling a transfer of data between a host and a surface of one of a plurality of disks in said disk drive apparatus via a read/write head, a method of controlling a transfer of data between the disk controller and disk comprising:
   counting in a first counter a first amount of time to a beginning of a data field;
   generating a first signal in a data sector/servo split generator when a beginning of a data field is encountered by a read/write head;
   supplying said first signal to a disk controller in a disk drive apparatus;
   generating a second signal in a said sector/servo split generator if said data field following the generation of said first signal is split by a servo sector field;
   counting in a second counter a predetermined number of data bytes transferred between a surface of a disk in said disk drive apparatus and said disk controller;
   generating a third signal by said data sector/servo split generator when said second signal is generated and said predetermined number of data bytes are transferred between said disk and said disk controller indicating a servo sector field split of said data field;
   sending said third signal to said disk controller, such that said disk controller controls the transfer of data and servo information from and to said disk in dependence on said first and third signals; and
   generating a signal as a timing reference for marking a sector such that the first signal is subsequently generated, wherein the timing reference signal is independent of the rotational position of the disk the timing reference being a synchronizing signal for generating a sector pulse signal which is independent of an index signal related to the rotational position of the disk.

11. The method of claim 10 further comprising:
   supplying said first amount of time value by a microprocessor coupled to said data sector/servo split generator.

12. The method of claim 11 further comprising:
   storing in a first register said first amount of time from said microprocessor such that when said first counter reaches a value equal to said first amount of time, said first signal is generated.

13. The method of claim 12 wherein said first signal is generated by a first comparator coupled to said first register and said first counter, said comparator generating said first signal when an output of said counter and an output of said first register are equal.

14. The method of claim 10 wherein said first amount of time is an amount of time between a detection of an address mark on the surface of said disk and the beginning of a data sector.

15. The method of claim 10, further comprising:
   supplying said predetermined number value by a microprocessor coupled to said data sector/servo split generator.

16. The method of claim 15, further comprising:
   storing in a second register said predetermined number from said microprocessor, such that said third signal is generated when said predetermined number of data bytes are transferred between said disk controller and said disk and said second signal is generated.

17. The method of claim 16, further comprising:
   outputting a signal from a second comparator coupled to said second counter and said second register when an output of said second register is equal to an output of said second register.

18. The method of claim 10 further comprising:
   counting in a third counter a number of occurrences of said first signal; and
   storing in a third register a value from said microprocessor representing a predetermined number of said occurrences of said first signal, wherein a third comparator coupled to said third counter and said third register outputs said second signal when an output of said third counter is equal to an output of said third register.

19. In a disk drive apparatus implementing a zone bit recording format and having an embedded sector servo system where servo sector field s split at least one data field on a surface of a disk rotatable to different positions in said disk drive apparatus, said disk drive apparatus having a read/write controller including a disk controller coupled to a data sector/servo generator, said disk controller controlling a transfer of data between a host and a surface of one of a plurality of disks in said disk drive apparatus via a read/write head, said data sector/servo split generator comprising:
   a first counter counting a first amount of time to a beginning of a data field, such that a first signal is generated when a beginning of a data field is encountered by a read/write head, said first signal being supplied to a disk controller in a disk drive apparatus, such that a second signal is generated by said data sector/servo split generator if said data field after the generation of said first signal is split by a servo sector field;
   a second counter counting a predetermined number of data bytes transferred between a surface of a disk in said disk drive apparatus and said disk controller, such that a third signal is generated when said second signal is generated and said predetermined number of data bytes are transferred between said disk and said disk controller indicating a servo sector field split of said data field, said third signal being sent to said disk controller, such that said disk controller controls the transfer of data and servo information from and to said disk in dependence on said first and third signals; and
   means for generating a synchronizing signal for effectively generating a sector pulse, wherein the timing reference signal is independent of the rotational position of the disk, and the sector pulse being independent of an index signal related to the rotational position of the disk.

20. In a disk drive apparatus implementing a zone bit recording format and having an embedded sector servo system where servo sector fields split at least one data field on a surface of a disk rotatable to different positions in said disk drive apparatus, said disk drive apparatus having a read/write controller including a disk controller coupled to a data sector/servo generator, said disk controller controlling a transfer of data between a host and a surface of one of a plurality of disks in said disk drive apparatus via a read/write head, a method of controlling a transfer of data between the disk controller and disk comprising:

counting in a first counter a first amount of time to a beginning of a data field;

generating a first signal in a data sector/servo split generator when a beginning of a data field is encountered by a read/write head;

supplying said first signal to a disk controller in a disk drive apparatus;

generating a second signal in a said sector/servo split generator if said data field following the generation of said first signal is split by a servo sector field;

counting in a second counter a predetermined number of data bytes transferred between a surface of a disk in said disk drive apparatus and said disk controller;

generating a third signal by said data sector/servo split generator when said second signal is generated and said predetermined number of data bytes are transferred between said disk and said disk controller indicating a servo sector field split of said data field;

sending said third signal to said disk controller, such that said disk controller controls the transfer of data and servo information from and to said disk in dependence on said first and third signals; and generating a synchronizing signal for effectively generating a sector pulse, wherein the timing reference signal is independent of the rotational position of the disk and the sector pulse being independent of an index signal related to the rotational position of the disk.

* * * * *